N. H. ALBRECHT & W. A. BALDWIN.
MOUSE TRAP.
APPLICATION FILED SEPT. 4, 1918.

1,283,018.

Patented Oct. 29, 1918.

WITNESSES
Wentworth Proctor

INVENTOR
N. H. ALBRECHT AND W. A. BALDWIN.

BY
ATTORNEYS

UNITED STATES PATENT OFFICE.

NUNNALLY H. ALBRECHT AND WALTER A. BALDWIN, OF DAWSON, GEORGIA.

MOUSE-TRAP.

1,283,018.  Specification of Letters Patent.  Patented Oct. 29, 1918.

Application filed September 4, 1918. Serial No. 252,598.

*To all whom it may concern:*

Be it known that we, NUNNALLY H. ALBRECHT and WALTER A. BALDWIN, citizens of the United States, and residents of Dawson, in the county of Terrell and State of Georgia, have invented certain new and useful Improvements in Mouse-Traps, of which the following is a specification.

Our invention is an improvement in mouse traps, and has for its object to provide a simple, inexpensive yet efficient trap of the character specified, wherein a casing is provided having at one end a removable cover carrying bait and having at the other end means for preventing return movement of the mouse when it enters the casing, said means, however, permitting the free entrance of the mouse.

Figure 1:
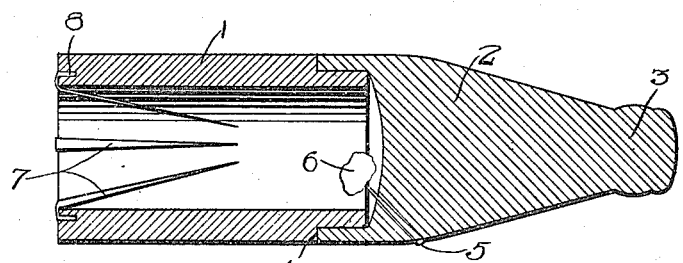
Figure 1 is a vertical section through one embodiment of the invention.
Figure 2:
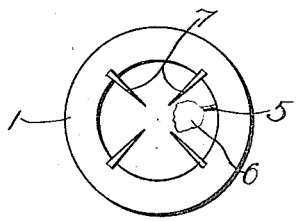
Fig. 2 is an end view.

In the embodiment of the invention shown in Figs. 1 and 2, a casing 1 is provided of tubular form, and in the present instance cylindrical, and a cover 2 is provided for one end of the casing, the said cover having a handle or grip 3 for convenience in handling the trap.

The casing 1 has that end adjacent to the cover rabbeted, as shown at 4, to fit within the flange of the cover, and the cover has a spike 5 extending through the same for carrying bait, indicated at 6, which may be of any suitable material. This spike is of a length to hold the bait at the inner end of the casing 1. The casing at the opposite end has a series of inwardly extending spikes or spurs 7, the said spikes or spurs inclining inwardly toward the axis of the casing 1.

Each of these spikes or spurs, as shown, has its outer end bent to engage within a notch or recess 8 in the outer end of the casing, and the free ends of the spikes, that is the ends within the casing, are pointed, as shown. In the present instance four spikes are provided and their pointed ends are close enough to prevent the return movement of the mouse while permitting its free entrance to the bait.

Figure 3:
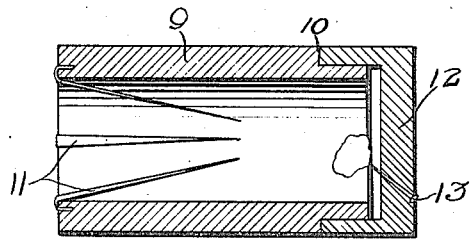
Fig. 3 is a similar view of another embodiment.
Figure 4:
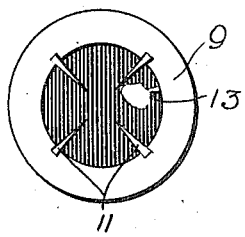
Fig. 4 is an end view of Fig. 3.

In the embodiment of the invention shown in Figs. 3 and 4 the casing 9 is similar to the casing 1, having one end rabbeted as shown at 10, and having at the other end spikes 11 arranged in the same manner as the spikes 7. The cover is a cap indicated at 12, which engages the rabbeted portion of the casing, and this cap carries a bait holder indicated at 13.

In the operation of both constructions, the cover is removed and the bait is placed upon the bait carrying spike 5 or 13 as the case may be. The cover is then replaced and the device is ready for the entrance of the mouse. The mouse can easily enter but cannot return, and he may be killed by drowning or the like, after which the body may be removed by removing the cover.

We claim:

1. A trap of the character specified comprising a tubular casing having at one end a series of longitudinally extending spurs, said spurs being within the casing and inclining inwardly toward their free ends and toward the opposite end of the casing from their attachment, and a cover detachably connected with the said opposite end and having a bait carrier, said cover having a grip or handle for convenience in manipulating the trap.

2. A trap of the character specified, comprising a tubular casing having at one end a series of longitudinally extending spurs, said spurs being within the casing and inclining inwardly toward their free ends and toward the opposite end of the casing from their attachment, and a cover detachably connected with the said opposite end and having a bait carrier.

NUNNALLY H. ALBRECHT.
WALTER A. BALDWIN.

Copies of this patent may be obtained for five cents each, by addressing the "Commissioner of Patents, Washington, D. C."